(12) United States Patent
Reid

(10) Patent No.: US 8,217,525 B2
(45) Date of Patent: Jul. 10, 2012

(54) WIND ASSISTED ELECTRIC VEHICLE

(76) Inventor: Gary Dean Reid, Las Vegas, NV (US)

( * ) Notice: Subject to any disclaimer, the term of this patent is extended or adjusted under 35 U.S.C. 154(b) by 364 days.

(21) Appl. No.: 12/556,794

(22) Filed: Sep. 10, 2009

(65) Prior Publication Data

US 2011/0057450 A1    Mar. 10, 2011

(51) Int. Cl.
*F03D 11/00* (2006.01)
(52) U.S. Cl. .......................................................... 290/55
(58) Field of Classification Search .................. 290/55
See application file for complete search history.

(56) References Cited

U.S. PATENT DOCUMENTS

| | | | | |
|---|---|---|---|---|
| 4,075,545 | A * | 2/1978 | Haberer | 322/35 |
| 5,048,864 | A * | 9/1991 | Geiger | 280/755 |
| 5,680,032 | A * | 10/1997 | Pena | 290/52 |
| 7,434,636 | B2 * | 10/2008 | Sutherland | 180/2.2 |
| 7,652,389 | B2 * | 1/2010 | Farmer | 290/55 |
| 2005/0210858 | A1 * | 9/2005 | Gore et al. | 60/201 |
| 2006/0153672 | A1 * | 7/2006 | Davis | 415/4.2 |
| 2010/0140949 | A1 * | 6/2010 | Pitre et al. | 290/55 |

FOREIGN PATENT DOCUMENTS

FR     2769052 A1 *  4/1999
FR     2904061 A1 *  1/2008

* cited by examiner

*Primary Examiner* — Joseph Waks
(74) *Attorney, Agent, or Firm* — Oakwood Law Group, LLP; Yuchien Wei

(57) ABSTRACT

A vehicle having an electric drive motor and a battery pack which provides power to the motor. The vehicle has panels that provide a wind tunnel when the vehicle is in motion, and a wind generator which is positioned inside or outside the wind tunnel to supply electricity to the power pack while the vehicle is in motion. When the vehicle is parked, the wind generator is repositioned to be above the vehicle where it is driven by a breeze around the vehicle to again supply power to the power pack. The power pack is charged while the vehicle is being driven or parked by wind power only. It does not have to be plugged in.

3 Claims, 3 Drawing Sheets

WIND ASSISTED ELECTRIC VEHICLE

BACKGROUND OF THE INVENTION

1. Field of the Invention

The present invention relates generally to a power system for a land vehicle and more specifically to a system that uses a wind driven generator to generate electricity to recharge a battery pack. The wind driven generator is located in an enclosed wind tunnel in the vehicle while the vehicle is in motion and can be repositioned to be moved out of the wind tunnel and be located to be driven by prevailing winds when the vehicle is parked. Thus, the wind driven generator actively operates to charge a pack of batteries while the vehicle is in motion and is parked

2. Description of Related Art

The various automobile companies are developing electric and plug in hybrid cars. One such vehicle that is being developed is powered by a lithium-ion battery pack that can be recharged through a traditional power outlet where the range is about 40 miles. For longer drives, the vehicle includes a small gasoline engine that takes over, powering a generator that created electricity to run the vehicle's motor.

Another vehicle being developed is a totally electric car that needs to be recharged when its battery charge is depleted.

What is needed is a car that can have its batteries recharged while the car is in motion and parked without plugging the car into an outlet.

SUMMARY OF THE INVENTION

In an exemplary embodiment of the present invention, there is disclosed a vehicle having an electric drive motor and a battery pack which provides power to the motor. The vehicle has panels that provide a wind tunnel when the vehicle is in motion, and a wind generator is removably located in the wind tunnel to supply electricity to the power pack while the vehicle is in motion. When the vehicle is parked, the wind generator is repositioned to be above the vehicle where it is driven by a breeze around the vehicle to again supply power to the power pack. The power pack is charged while the vehicle is being driven or is parked by wind power only. It does not have to be plugged in.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
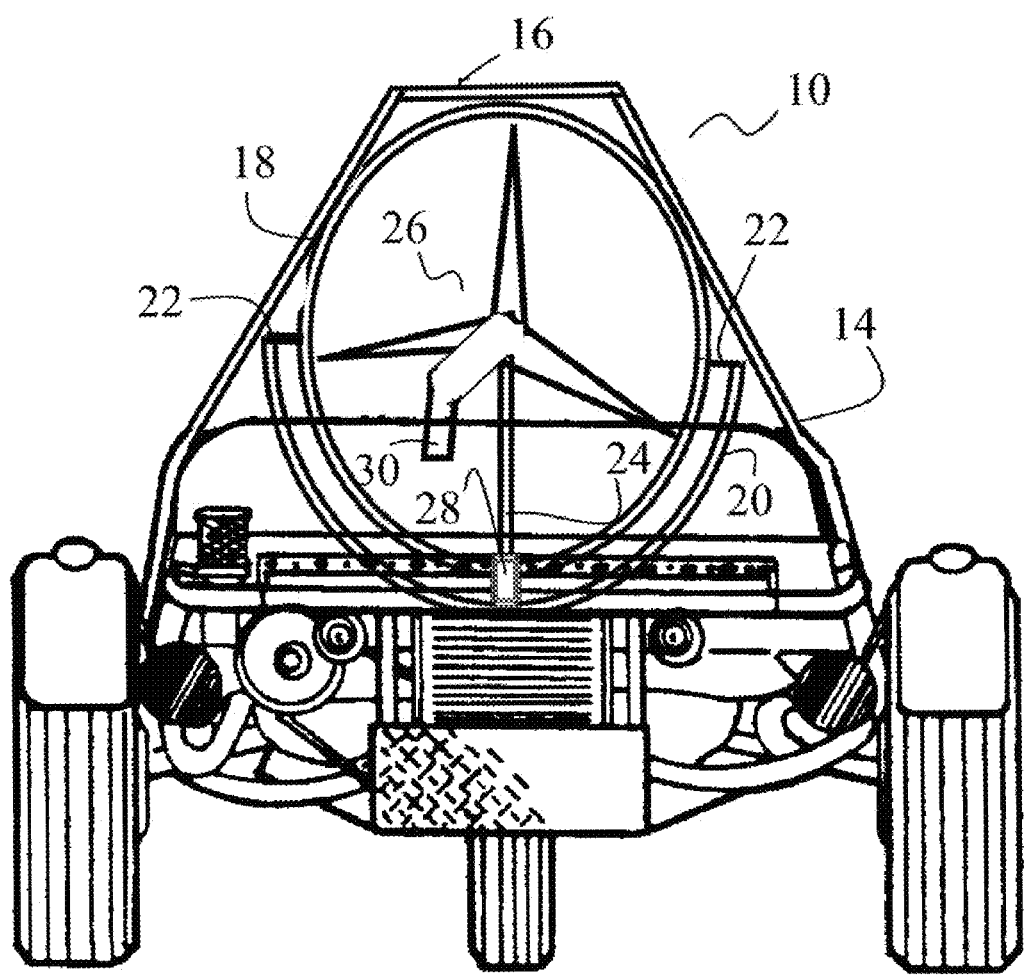
FIG. 1 is a rear perspective view of a vehicle absent the side panels showing the wind generator in a wind tunnel to generate electricity when the vehicle is in motion in accordance with the principles of the invention.

Referring to FIG. 1, there is shown a rear perspective view of a vehicle 10, absent the body panels, having a wind generator which is located in a wind tunnel when the body panels are attached to generate electricity when the vehicle is in motion.

The vehicle shown is a 3 wheeled tricycle that has an automotive rear differential, not shown, a motorcycle front end and an electric motor that can be coupled directly to the rear differential with a driveshaft. The direct drive reduces weight of the vehicle by eliminating the need for a transmission with its many moving parts. Also included is a power controller and a bank of batteries that are used to store the electrical energy produced by the wind generator. It is understood that this invention in not limited to a tricycle type of motor vehicle shown, and that the vehicle can be another type of vehicle such as a 4 wheel vehicle.

In addition, the drive system for the vehicle is not limited to a differential with a driveshaft. In an embodiment, the weight of the vehicle can be reduced by using light weight differentials in the hubs of each rear wheel in place of the relatively heavy automotive type of differential drive.

In still another embodiment, a further reduction of weight can be obtained by substituting a hydraulic drive system where a hydraulic drive motor is coupled to each rear wheel through a hub differential and the hydraulic motors are coupled via hydraulic lines to a hydraulic pump that is driven by an electric motor. With the vehicle shown in FIG. 1, the battery pack can be located at the rear of the vehicle behind the passenger compartment and the electrical motor can be located at the end of the drive shaft.

The frame of the body consists of a plurality of light weight tubular members 14 made of aluminum or other light weight material welded together to form a funnel shaped member 16 when covered with panels of aluminum or plastic. The vehicle shown in the FIGS. is shown without the outside panels for clarity only, and it is understood that this invention relates to a vehicle that is fully enclosed and can be used in all weather conditions.

A circular ring 18 of aluminum or the like is located at the rear of the funnel shaped member. A half circle hoop member 20 composed of aluminum or other light weight rigid material is rotatably connected to the ring 18 at two pivot points 22. This member rotates about a horizontal axis. The pivots allow the half circle hoop to be rotated from a down position to a raised position. One end of a wind generator support member 24 is attached to the center of the half circle hoop member 20 with a rotatably pivotably coupling 28. A wind generator 26 having a wind vane 30 is coupled to the other end of the support member. The rotatably pivotably coupling can rotate about a vertical axis, pivot about a horizontal axis and can be selectively locked to prevent motion about either or both axis.

Not shown are control members that are used to raise and lower the half circle hoop member 20 about the pivot points 22 on the ring 18, to orient the half circle hoop member 20 and the wind generator support member 24 from a location as shown in FIG. 1 to a raised position where the wind generator 26 is located above the car. A mechanism for raising and lowering the wind generator 26 as above noted is not shown as this is within the knowledge of one familiar with the art of levers and mechanism.

Figure 2:
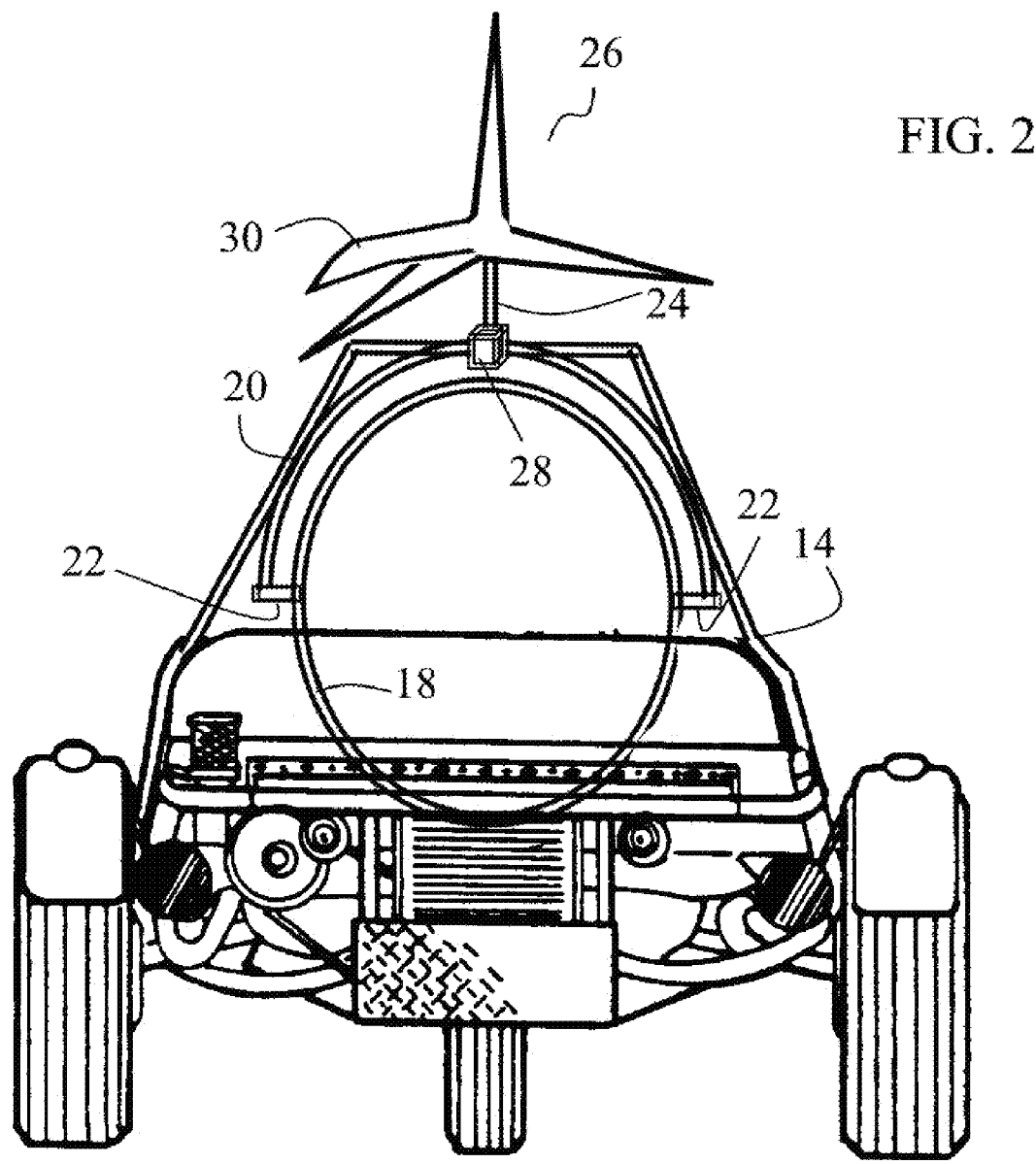
FIG. 2 is a rear perspective view of the vehicle absent the side panels showing the wind generator in a raised position to generate electricity by using prevailing winds when the vehicle is parked in accordance with the principles of the invention.

Referring to FIG. 2, there is shown a rear perspective view of the vehicle absent the side panels with the wind generator in a raised position to generate electricity by using prevailing winds when the vehicle is parked. In this FIG., the half circle hoop member 20 has been rotated about pivot points 22 to be in a raised position, wind generator support member 24 has then been rotated from a lowered position to a raised position and rotated 180 degree to face the front of the vehicle. Means are provided to releasably lock the rotatably pivotably coupling while the wing generator is being raised and lowered and to lock the wind generator support member in its vertical position but allow the wind generator to rotate when it is raised to allow the wind generator to face a prevailing wind.

Figure 3:
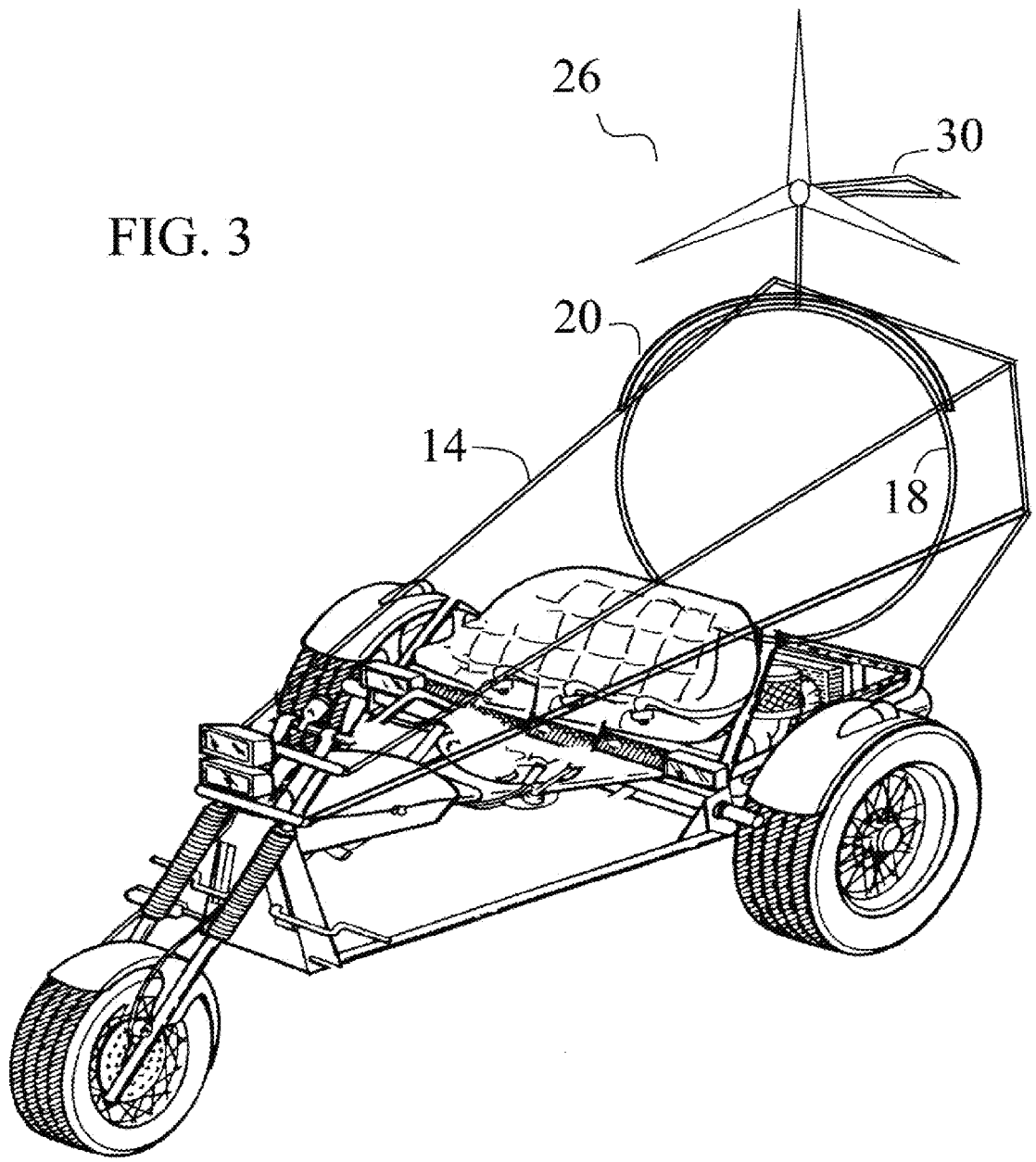
FIG. 3 is a side perspective view of the vehicle absent the side panels showing the wind generator in a raised position to generate electricity by using prevailing winds when the vehicle is parked in accordance with the principles of the invention.

Most if not all wind generators will operate in winds from 5 to 35 MPH and withstand winds up to 100 MPH. However, they stall at about 35 MPH and remain in the stall mode until wind speeds drop below 32 MPH. To prevent the wind generator here disclosed from stalling when the vehicle is moving faster than 32 MPH, the wind generator 26 is located in a wind tunnel formed by top and side panels that are attached to the tubular members 14 to form the funnel shaped member. The top and/or side panels are provided with adjustable are scoops are that are used to regulate the amount of air that flows to the wind generator while the vehicle is moving. The scoops can be hinged flaps that automatically open and close to limit the air that enters the wind tunnel and moves to the wind generator to 32 MPH. To more clearly show the features of the invention, neither the side and top panels nor the adjustable air scoops that are located in the top and/or side panels are shown Referring to FIG. 3, there is shown a side perspective view of the vehicle absent the side panels with the wind generator 26 in a raised position to generate electricity by using prevailing winds when the vehicle is parked. When the vehicle is parked and the wind generator is in the raised position, the wind generator is free to rotate 360 degrees about a vertical axis. The wind vane 30 attached to the wind generator orients the wind generator to face a prevailing wind to charge a battery pack when the vehicle is parked. When the vehicle is moving, the wind generator is located in the wind tunnel and the speed of the air that turns the blades of the wind generator is controlled to not exceed 32 MPH. Thus, with this invention, the battery pack can be charged by the wind generator while the vehicle is moving or it is parked.

In this application there is disclosed a vehicle that has no gas tank, no gasoline engine and no power cord. Power to the battery pack is supplied by the wind which cost nothing and at the same time uses an inexhaustible natural resource. Vehicle maintenance costs are minimal because of the very small number of moving parts and fossil fuels that are destructive to the environment are not used.

No more oil changes, no need for a radiator and coolant, no need for a tune-up, no need to ever stop at the gas station to refuel, and no need to plug in your car to charge the battery pack. All that is needed is a small breeze to fully recharge the battery pack while the vehicle is parked.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. A vehicle having an electric drive motor comprising:
   a battery pack coupled to provide power to said motor;
   panels on said vehicle oriented to provide a wind tunnel; and
   a wind generator removably located in said wind tunnel to supply electricity to said power pack while said vehicle is in motion, said wind generator is attached to a support member coupled to a half circle hoop member with a rotatably pivotably coupling that is rotatable about a verticle axis and is pivotal about a horizontal axis.

2. The vehicle of claim 1 wherein said rotatably pivotably coupling is selectively lockable about either axis.

3. The vehicle of claim 1 wherein said half circle hoop is pivotally coupled to a circular ring.

* * * * *